United States Patent
Nussbaum et al.

(10) Patent No.: US 11,642,839 B2
(45) Date of Patent: May 9, 2023

(54) LAYER-WISE CONTROL OF POST CONDENSATION FOR ADDITIVE MANUFACTURING

(71) Applicant: UNIVERSITY OF SOUTH FLORIDA, Tampa, FL (US)

(72) Inventors: Justin Nussbaum, Knoxville, TN (US); Nathan Crane, Lutz, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 0 days.

(21) Appl. No.: 17/277,949

(22) PCT Filed: Jul. 22, 2019

(86) PCT No.: PCT/US2019/042813
§ 371 (c)(1),
(2) Date: Mar. 19, 2021

(87) PCT Pub. No.: WO2020/060665
PCT Pub. Date: Mar. 26, 2020

(65) Prior Publication Data
US 2021/0370586 A1    Dec. 2, 2021

Related U.S. Application Data

(60) Provisional application No. 62/734,537, filed on Sep. 21, 2018.

(51) Int. Cl.
| | |
|---|---|
| *B33Y 10/00* | (2015.01) |
| *B33Y 40/10* | (2020.01) |
| *B29C 64/153* | (2017.01) |
| *B33Y 50/02* | (2015.01) |
| *B29C 64/245* | (2017.01) |

(52) U.S. Cl.
CPC .......... *B29C 64/153* (2017.08); *B29C 64/245* (2017.08); *B33Y 10/00* (2014.12); *B33Y 40/10* (2020.01); *B33Y 50/02* (2014.12)

(58) Field of Classification Search
CPC ................ B29C 64/153; B29C 64/245; B29C 2035/0838; B29C 35/08; B33Y 10/00; B33Y 40/10; B33Y 50/02; B33Y 70/10
See application file for complete search history.

(56) References Cited

U.S. PATENT DOCUMENTS

| | | |
|---|---|---|
| 5,431,967 A | 7/1995 | Manthiram et al. |
| 7,625,198 B2 | 12/2009 | Lipson et al. |
| 2013/0304233 A1 | 11/2013 | Dean et al. |
| 2014/0163717 A1 | 6/2014 | Das et al. |
| 2014/0314613 A1* | 10/2014 | Hopkinson ............ B33Y 10/00 264/460 |
| 2015/0024309 A1 | 1/2015 | Martin |
| 2015/0028523 A1 | 1/2015 | Jaker et al. |
| 2016/0167323 A1 | 6/2016 | Valeri et al. |
| 2017/0072633 A1* | 3/2017 | Hsu ...................... B29C 64/118 |
| 2017/0253702 A1 | 9/2017 | Ma et al. |
| 2021/0129428 A1* | 5/2021 | Gu .......................... B29C 64/35 |

FOREIGN PATENT DOCUMENTS

WO    WO-2019013814 A1 *  1/2019    ........... B29C 64/165

OTHER PUBLICATIONS

International Search Report and Written Opinion in PCT/US2019/042813, dated Jan. 7, 2020. 9 pages.
International Preliminary Report on Patentability issued for Application No. PCT/US2019/042813, dated Apr. 1, 2021.

\* cited by examiner

*Primary Examiner* — Alexander M Weddle
(74) *Attorney, Agent, or Firm* — Meunier Carlin & Curfman LLC

(57) ABSTRACT

The disclosed subject matter relates to method for increasing the molecular weight of a polymer material during an additive manufacturing process. The method can comprise disposing a first layer of the polymer material at a target surface; exposing the first layer of the polymer material to an energy source for a sufficient period of time to sinter or melt and undergo a condensation reaction at least at a portion of the polymer material; controlling the condensation reaction to allow a desired increased number average molecular weight of the polymer material; and repeating the method steps to form an object in a layerwise fashion. Controlling the condensation reaction can comprise controlling and/or adjusting an energy 10 source-related parameter, a polymer-related parameter, a temperature related parameter, a vacuum related parameter, a process duration, a processing gas, an air flow volume and/or speed, or a combination thereof.

15 Claims, No Drawings

LAYER-WISE CONTROL OF POST CONDENSATION FOR ADDITIVE MANUFACTURING

CROSS REFERENCE TO RELATED APPLICATIONS

This application is a United States National Phase Patent Application of International Patent Application Number PCT/US2019/042813, filed on Jul. 22, 2019, which claims the benefit of priority to U.S. Provisional Application No. 62/734,537, filed Sep. 21, 2018, which is incorporated by reference herein in its entirety.

STATEMENT ACKNOWLEDGING OF GOVERNMENT SUPPORT

This invention was made with government support under grant no. CMMI1563037 awarded by the National Science Foundation. The Government has certain rights in the invention.

BACKGROUND

In polymer powder bed fusion additive manufacturing technologies, mechanical properties of the products are typically inferior to those of products produced by conventional manufacturing methods, such as injection molding. This is partially due to the lower molecular weights of the polymers used in polymer powder bed fusion processes which are required for a lower viscosity. What are needed are methods of increasing the molecular weight of a material during a manufacturing process to provide a stronger product. The methods disclosed herein address these and other needs.

SUMMARY

In accordance with the purposes of the disclosed materials and methods, as embodied and broadly described herein, the disclosed subject matter, in one aspect, relates to methods of making materials. In specific aspects, the disclosed subject matter relates to methods for controlling the molecular weight of a polymer material during an additive manufacturing process. The method can comprise disposing a first layer of the polymer material on a platform, exposing the first layer of the polymer material to an energy source for a sufficient period of time to fuse or melt at least a portion of the polymer material and undergo a condensation reaction, controlling the condensation reaction by allowing a desired increased number average molecular weight of the polymer material, and repeating the method steps to form an object in a layerwise fashion. In certain embodiments, the additive manufacturing process includes a sintering or melting process, such as a layerwise sintering process.

The polymer material used in the methods can comprise any polymer that can be produced by condensation such as a polyamide, a polyester, a polystyrene, a polyacetal, a polyalkylene, cellulose, a poly ether ether ketone, a poly ether ketone, a poly ether ketone ketone, a poly (meth) acrylate, a polyimide, a thermoplastic urethane, a polyether, a polyketone, a polycarbonate, a thermoplastic elastomer, a polyolefin, a copolyester, a thermoplastic vulcanite, a polyethene, a polystyrene, a poly vinyl chloride, a blend thereof, a copolymer thereof, or a derivative thereof. The layer of polymer material can have a thickness of from 10 microns to 1 mm.

The method can include maintaining the platform at an elevated temperature below an initial melting temperature or sintering temperature of the polymer material and/or preheating the surface of the layer of powder polymer prior to step (b). The energy source may be selected from an image from an image projector, an array of LEDs or lasers, or an effectively constant exposure obtained by repeatedly scanning a point source at high rate of speed over the layer of the polymer material. in some examples, the energy source can be a laser beam. In some cases, step (b) can include exposing the first layer of the polymer material to an electromagnetic beam or image, wherein there is no movement of the electromagnetic beam or image relative to the polymer material. In other cases, step (b) can include scanning an electromagnetic beam or image across the first layer of the polymer according to a given path.

The energy source increases the temperature of the first layer of the polymer.

Controlling the condensation reaction can comprise controlling and/or adjusting an energy source-related parameter, a polymer-related parameter, a temperature related parameter, a vacuum related parameter, a process duration, a processing gas, an air flow volume and/or speed, or a combination thereof. For example, controlling the condensation reaction comprises controlling and/or adjusting an energy source-related parameter, such as an intensity, pulse frequency, pulse duration, or a combination thereof of the energy source. The energy source for controlling the condensation reaction can be selected from an image from an image projector, an array of LEDs or lasers, or an effectively constant exposure obtained by repeatedly scanning a point source at high rate of speed over the layer of the polymer material. The energy source can be projected for a duration of at least one second, preferably from 1 second to 30 seconds, more preferably from 1 second to 15 seconds.

After condensation, the polymer material can have a molecular weight that is at least 5% by weight greater, at least 10% by weight greater, than its molecular weight before condensation. In certain embodiments, controlling the condensation reaction can comprise directing energy from an energy source to the layer of polymer material for a sufficient period of time such that the polymer material exhibits a molecular weight increase of at least 5% by weight greater, or at least 10% by weight greater, than its molecular weight before condensation. Step (d) can be carried out to fuse the polymer material in a second layer to a fused portion of the first layer.

Additional advantages will be set forth in part in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

DETAILED DESCRIPTION

The materials, compounds, compositions, and methods described herein may be understood more readily by reference to the following detailed description of specific aspects of the disclosed subject matter, the Figures, and the Examples included therein.

Before the present materials, compounds, compositions, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

General Definitions

In this specification and in the claims that follow, reference will be made to a number of terms, which shall be defined to have the following meanings:

Throughout the specification and claims the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a material" includes mixtures of two or more such materials, and the like.

"Optional" or "optionally" means that the subsequently described event or circumstance can or cannot occur, and that the description includes instances where the event or circumstance occurs and instances where it does not.

Notwithstanding that the numerical ranges and parameters setting forth the broad scope of the disclosure are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used. Further, ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. Unless stated otherwise, the term "about" means within 5% (e.g., within 2% or 1%) of the particular value modified by the term "about."

As used herein, the term "composition" is intended to encompass a product comprising the specified ingredients in the specified amounts, as well as any product which results, directly or indirectly, from combination of the specified ingredients in the specified amounts.

The term polymer encompasses oligomers, cooligomers, polymers and copolymers, for example random block, multiblock, star or gradient copolymers.

References in the specification and concluding claims to parts by weight of a particular element or component in a composition denotes the weight relationship between the element or component and any other elements or components in the composition or article for which a part by weight is expressed. Thus, in a mixture containing 2 parts by weight of component X and 5 parts by weight component Y, X and Y are present at a weight ratio of 2:5, and are present in such ratio regardless of whether additional components are contained in the mixture.

Methods

Polymer materials used for example in manufacturing process such as powder bed fusion technologies generally require a molecular weight (MW) low enough to flow (viscosity of the melt is proportional to MW) during the allotted sintering time. However, the mechanical and physical properties of polymers can be crucially dependent on the molecular weight of the polymer. The methods disclosed herein can be used for increasing the molecular weight of a polymer material during a manufacturing process. In certain embodiments, the disclosed methods provide a means for controlling a condensation reaction which can occur during a manufacturing process. The term "condensation" or "polycondensation" as used herein refers to a reaction in which two or more molecules (such as two or more polymers) combine to form a larger molecule with simultaneous loss of a small molecule such as water or an alcohol. The condensation reaction can form a polymer, for example, having an ester linkage, a urethane linkage, an ether linkage, an amide linkage, an amine linkage, or a combination thereof. By "controlling" the condensation reaction as used herein is meant increasing the molecular weight of the polymer material from the molecular weight of the product that would have been obtained when the polymer material is used in a conventional manufacturing process such as sintering or melting. In some aspects, the manufacturing process can be an additive manufacturing process. Such additive manufacturing processes can include polymer powder bed fusion while being sintered or melted in additive manufacturing, a fused deposition modeling process, or a fused filament fabrication process.

Suitable polymers for use in the methods disclosed herein can be selected from any polymer that can undergo a condensation reaction. In some embodiments, the polymer can include one that is produced by condensation such as polylactic acid (PLA), polycarbonates (PC), polystyrenes (PS) including styrene maleic anhydrides (SMA), polyketones, polyethers, polyether ether ketones (PEEK), poly ether ketone (PEK), poly ether ketone ketones, polyhydroxyalkanoates (PHA), polyacetals, polyesters including polyethylene terephthalates (PET) and polycaprolactones, polyoxyalkylenes, polyoxyalkylene/polyester copolymers, polyamides (PA) including nylons, blends thereof, copolymers thereof, derivatives thereof, or combinations thereof. The polymers can also include acrylonitrile butadiene styrene (ABS), polyolefins, polyvinyl chlorides (PVC), chlorinated polyvinyl chlorides (CPVC), polyvinylidene chlorides, acrylic resins, vinyl ester resins, phenolic resins, urea resins, melamine resins, epoxy resins, alkyd resins, polyalkyleneimines (e.g., polyethyleneimine), polyvinylpyrrolidone, polyallylamine, polyether polyamines (e.g., polyoxyethylene polyamine), polyurethane elastomers, or can be copolymerized with comonomer units selected from ethylenically unsaturated carboxylic acids, ethylenically unsaturated carbonates, ethylenically unsaturated urethanes, ethylenically unsaturated alcohols, ethylenically unsaturated aromatics, alkyl acrylates, alkyl methacrylates, ethylene vinyl alcohols, vinyl acetates, styrenes, and hydroxyalkanoic acid, polyphenylene sulfide, blends thereof, copolymers thereof, derivatives thereof, or combinations thereof. The polymer material can have a number average molecular weight of from 1,000 to 2,000,000 g/mol, such as from 1,000 to 1,000,000 g/mol, from 2,000 to 500,000 g/mol, from 2,000 to 250,000 g/mol. The number average molecular weight can be determined by gel permeation chromatography (GPC), matrix-aided LASER desorption/ionization mass spectrometry (MALDI-MS) or, when the initiator bears a group distinguishable from the monomers, by NMR spectroscopy or other customary methods Blends of the selected polymers may include blending the polymers with other powder materials. These powder materials may include, for example, at least one of glass beads, hollow glass spheres, other polymers, minerals, clays, ceramics, metals, fibrous materials such as carbon or glass fibers, flame-retardant additives, color additives, and/or other suitable materials.

The polymer material may be in the form of a powder that absorbs light at one or more wavelengths of light from the energy (light) source. In an additional embodiment, the polymer material may further include an absorber that absorbs light at one or more wavelengths of light from the energy source. Various absorbers could be added globally by premixing into the polymer material, or locally, to help control the absorption areas of the layer of polymer material.

The disclosed methods can include disposing a first layer of polymer material, such as in the form of a dry powder, slurry, a liquid (e.g., a photopolymer resin) on a platform. The underlying platform can be, for example, an initial seeding piece or a previously created layer on which a first layer of the polymer material is placed before being processed. The first layer can be disposed on the platform to a desired thickness, depending on the specific polymer material and/or the end use of the material.

The platform can be pre-heated to improve processing speed. In some examples, the platform can be pre-heated to temperatures below the melting temperature or glass transition temperature of the polymer material. By preheating the polymer material to just under its melting temperature or glass transition temperature, less optical energy from the energy source (e.g., the projector) is required to melt or sinter the polymer material. A heated chamber, or other thermally controlled chamber, may be used to pre-heat the polymer material to a desired pre-heated temperature. In some embodiments, the interior of the heated chamber is subjected to a flow of inert gas such as nitrogen, rather than standard atmospheric conditions. The inert gas can remove water vapor present prior to and/or formed during the manufacturing process. In some embodiments, the interior of the heated chamber is subjected to standard atmospheric conditions, rather than an inert nitrogen environment.

The disclosed methods can further include directing an energy source for a sufficient period of time to densify, fuse, or melt the polymer material. The term "densify" or "densification" as used herein refers to the process of thermodynamically manipulating a material with the intent of increasing its density above that of a typical reference value, thereby increasing its energy storage potential. In the present case, the polymer material can be densified by eliminating porosity that exists between particles in the material and is primarily driven by reduction of the surface energy of the particles. Densification can include melting and/or fusion of the polymer layer.

The term "fuse" as used herein refers to a state in which the starting polymer material have adhered or physically bonded to one another by the application of heat causing a change in shape of the initial starting material and combining to create a larger mass. The polymer material can be fused in the solid state (i.e., below the melting temperature), some in the liquid state after melting, and some through partial melting.

Fusion in the solid state is generally referred to as solid-state sintering. Sintering refers to a process in which the temperature of a material is raised to its softening point by thermal heating using an energy source, thereby causing the particles of the material to fuse together in the heated region. The temperature level needed for sintering depends on the material being sintered; but the higher the temperature is, the quicker it sinters. In some embodiments of the sintering process, an electromagnetic beam (e.g., laser beam) at a substantially constant power level is incident on a polymer material bed and a lateral layer of the part is fabricated by repeated scanning of the laser beam in successive lines across a layer of polymer material until the entire layer has been scanned. The laser is turned on at points where the polymer material is to be sintered, otherwise, the laser is off. When one layer is complete, the surface of the sintering bed is lowered, another layer of polymer material is spread over the previous, now sintered layer, and the next layer is scanned. This process is repeated until the part is complete. The mechanism for sintering is primarily diffusion between polymer material particles: because surface energy is proportional to total particle surface area, when particles reach sufficiently high temperatures, total surface area decreases in order to decrease surface energy which results in particle fusion.

Fusion in the liquid phase can include full melting, liquid-phase sintering, and indirect fusion. Generally, metal, ceramic, and polymer materials capable of being melted and re-solidified can be used for these approaches. With full melting, particles are fused by fully melting them with a high-power energy source such as a laser, electron beam, or other types of electromagnetic heating devices such as lamps and heating elements. Liquid-phase sintering uses a mixture of two polymer materials, in which the thermal source melts a lower-melting-temperature constituent, but a higher-melting-temperature constituent remains solid. The lower "melting" temperature constituent is sometimes referred to as the binder particle and the higher melting temperature constituent as the structural particle. An example of indirect fusion is a powder material comprising structural particles (e.g., a metal) coated with a binder (e.g., a polymer). Exposure to the thermal source melts the binder, thus inducing fusion, while the structural particle remains solid.

In general, this disclosure relates to any kind of sintering or melting process effected by a suitable energy source. For example, the energy source can be selected from a projected image, a laser beam, or an infrared source which increases the temperature of the material being sintered or melted. The energy source can be stationary or moving. For example, the method can include exposing the first layer of the polymer material to an electromagnetic beam or image. In some embodiments, the electromagnetic beam or image does not move relative to the first layer of the polymer. In other embodiments, the method can include scanning an electromagnetic beam or image across the first layer of the polymer according to a given path. The energy source increases the temperature of the first layer of the polymer.

As disclosed herein, the method can include causing the polymer material to undergo a condensation reaction and controlling the condensation reaction by allowing a desired increased number average molecular weight of the polymer material. The condensation reaction can be controlled after densifying, fusing, and/or melting the polymer material.

Condensation is generally caused by reaction of end groups in the polymer material with one another to eliminate a molecule such as water. For example, condensation can include reaction of free amino end groups and carboxy end groups in a polyamide powder with one another to eliminate water.

Controlling the condensation reaction to allow a desired increased number average molecular weight of the polymer material can include controlling and/or adjusting an energy source-related parameter (e.g., power, spot size, duration, and frequency), a temperature related parameter (e.g., powder-bed temperature, powder material supply temperature, temperature uniformity, and temperature monitoring), process duration (such as exposure to the energy source for greater than 100 ms, greater than 1 s, greater than 2 s, or greater than 5 s), process gas (a stream of inert gas such as nitrogen can remove the by-product(s) generated by the condensation reaction), air flow characteristics such as volumetric flow rate or air speed (e.g., increasing the inert gas flow rate increases the rate of by-product such as water removal and hence reaction rate), vacuum, or a combination thereof, to allow a desired increased number average molecular weight of the polymer material. In certain embodiments, the methods disclosed herein can include projecting an image from an energy source for a sufficient time and intensity to the polymer material such that the polymer material undergoes a condensation reaction. The image such as the power level can be adjusted to control the level on condensation. This condensation reaction can also be termed "post-condensation" or "solid state post-condensation." Crosslinking may also occur due to elimination of end groups.

Without wishing to be bound by theory, post condensation generally requires elevated temperatures for an extended period of time (relative to the fusing time during sintering) which prohibits the exploitation of this reaction in most additive manufacturing process since the powder particles in powder bed fusion technologies are exposed for microseconds to just a few seconds at a time. Since layerwise sintering systems are capable of providing extended sintering times (many seconds to minutes) while providing sufficient build rates, the post condensation reaction can be controlled to tune properties such as strength in ways not previously possible. Preferably, sintering and condensation of the polymer materials described herein are carried out using a projected image as the energy source. The methods, however, can be applied to laser sintering processes.

The methods described herein can also be applied to a fused deposition modeling process or a fused filament fabrication process. These processes are generally hot nozzle/filament-based 3D printing process. To gain higher molecular weight and strengths, a layer of the polymer material can be printed then exposed to a radiation source or another method described herein for causing condensation reaction after every layer. This process can provide higher quality parts.

In the methods disclosed herein, the energy source can be incident light. The incident light beam can be projected simultaneously and for a time span that is the same or substantially the same as condensation of the layer of polymer material. "Substantially the same" when referring to the time span of the incident light means that the two time spans in question occurs simultaneously and encompass the same or similar duration of time. In some cases, the duration of time for which the incident light is projected can be the same or greater than 50%, greater than 55%, greater than 60%, greater than 65%, greater than 70%, greater than 75%, greater than 80%, greater than 85%, greater than 90%, greater than 95%, greater than 96%, greater than 97%, greater than 98%, greater than 99%, greater than 99.5%, up to 100%, of the duration of time the material is allowed to condense.

Conventionally, sintering processes heat over a much shorter time scale than they condense when processing viscous materials such as polymers. In particular, energy is generally added more quickly (such as by a scanning laser) and then condensation continues after the energy source has been removed. In some embodiments, the polymer material is desirably condensed or fully condensed over the time span the incident light is projected on the material to sinter or melt the material. In some instances, the polymer material is desirably condensed or fully condensed simultaneously and over a time span greater than 50%, greater than 55%, greater than 60%, greater than 65%, greater than 70%, greater than 75%, greater than 80%, greater than 85%, greater than 90%, greater than 95%, greater than 96%, greater than 97%, greater than 98%, greater than 99%, greater than 99.5%, up to 100%, in which the incident light is projected on the material to sinter or melt the material. In other instances, the polymer material is desirably condensed or fully condensed over a time span greater than 100%, greater than 120%, greater than 130%, or greater than 150%, in which the incident light is projected on the material to sinter or melt the material.

In particular embodiments, the molecular weight of the polymer material can change by greater than 2%, greater than 5%, greater than 8%, greater than 10%, greater than 15%, greater than 20%, greater than 25%, greater than 30%, greater than 35%, greater than 40%, greater than 45%, greater than 50%, after condensation. For example, after condensation, the polymer material can have a molecular weight that is at least 5%, such as at least 10%, at least 15%, at least 20% greater than before condensation. In certain embodiments, controlling the condensation reaction can comprise directing energy from an energy source to the layer of polymer material for a sufficient period of time such that the polymer material exhibits a molecular weight increase of greater than 2%, greater than 5%, greater than 8%, greater than 10%, greater than 15%, or greater than 20%, than its molecular weight before condensation.

Longer heating allows for more time for the polymer material to densify, fuse, melt, and/or condense. The benefits of longer heating while maintaining build speed can be achieved through a relatively large area of heating (incident light) compared to the layer thickness of the polymer material. In some cases, the thickness of the material layer may be limited by its particle size. In general, layer thickness is greater than particle size, preferably at least two times the mean particle size of a powder material and larger than the largest particle size of the powder material. The maximum layer thickness is related to the heat transfer through the material. Incident light is either reflected, absorbed, or transmitted. Preferably, the layer thickness and particle size are selected so that a large portion (preferably at least 50%) of the light is absorbed and preferably around 70-90% is absorbed in a single layer. If very high fractions of the light are absorbed in a single layer (>95%) then the temperature gradients through the layer increase. In some cases, for example for large layer thickness, an absorber can be added to the material or it can be deposited between layers so that it absorbs from the bottom up or from the top down. In general, the layer of material has a thickness of from 10 microns to 1 mm (e.g., from 20 microns to 1 mm, from 50 microns to 1 mm, from 75 microns to 1 mm, from 100 microns to 1 mm, from 20 microns to 750 microns, from 50 microns to 750 microns, from 50 microns to 500 microns, from 100 microns to 750 microns, from 100 microns to 500 microns, or from 100 microns to 300 microns).

As described herein, the ratio of an area (in $mm^2$) of the incident light projected on the surface of the material and a thickness (in mm) of the layer of material is relatively large. In some embodiments, the ratio of an area (in $mm^2$) of the incident light projected on the surface of the material and a thickness (in mm) of the layer of material can be at least 30:1 (e.g., at least 30:1, at least 50:1, at least 75:1, at least 100:1, at least 150:1, at least 200:1, at least 300:1, at least 500:1, at least 750:1, at least 1000:1, at least 1500:1, at least 2000:1, at least 2500:1, at least 3000:1, at least 5000:1, at least 7500:1, at least 10000:1, at least 15000:1, at least 20000:1, at least 30000:1, at least 45000:1, at least 50000:1, at least 60000:1, at least 75000:1, or at least 100000:1). In some embodiments, the ratio of an area (in $mm^2$) of the incident light projected on the surface of the material and a thickness (in mm) of the layer of material can be from 30:1 to 100000:1 (e.g., from 30:1 to 75000:1, from 30:1 to 50000:1, from 30:1 to 45000:1, from 30:1 to 30000:1, from 30:1 to 20000:1, from 30:1 to 10000:1, from 30:1 to 5000:1, from 30:1 to 4000:1, from 30:1 to 3000:1, from 50:1 to 5000:1, from 50:1 to 3000:1, or from 100:1 to 3000:1). In one embodiment of the present disclosure, the area of the incident light projected on the surface of the material is such that an entire layer of material is densified, fused, melted, or condensed together at one time.

Heating (i.e., source of incident light) can be performed by projecting an image from an image projector onto a surface area of the layer of polymer material. Particularly, in the methods disclosed herein, Large Area Projection Sintering (LAPS), can be utilized for heating. LAPS uses a visible light projector to heat subsections or an entire desired shape in the XY-plane in a single exposure utilizing a high power projection system. Additive manufacturing processes using LAPS is disclosed in PCT/US2018/040624 and U.S. Ser. No. 15/230,651, the disclosures of which are hereby incorporated by reference in their entirety. In some embodiments, the LAPS processing system includes a platform for supporting a layer of material and at least one image projector, where the at least one image projector further includes, a light source, a digital light switch to modulate the light source based upon a digital signal to produce at least one image, at least one lens coupled to the digital light switch. In the material processing system of the present invention, the at least one image projector is configured to project the at least one image through the at least one lens and onto a surface area of the layer of material, wherein an intensity of the at least one image is sufficient to heat the layer of material to a desired temperature.

The system may further include a heated chamber to preheat the powdered material prior to exposing the material to the light from the projector. The light from the projector may be provided through a projection window positioned over the material. The system may further include a thermocouple or other temperature measurement device, such as a pyrometer or an infrared camera to measure the surface temperature from a distance or a thermistor which could be positioned within the material to measure the temperature of the material during the process. In the present disclosure, a blade or roller may be used to spread new uniformly smooth layers of the material over an aluminum platform. In one embodiment of the present disclosure, the high intensity projector provides a concentrated 7.3 W of optical power onto a 3.7 $cm^2$ exposure area. As such, the projection system is capable of exposing an entire layer of material simultaneously over the course of a few seconds. This method allows for longer exposure times without compromising the overall build time, which enable improved properties for processing of a wider variety of materials.

In an additional embodiment, the systems may further include a thermal camera to provide temperature feedback for the thermal feedback mechanism. The thermal camera can be positioned to collect thermal data from the surface of the material. In various embodiments, the thermocouples, pyrometers, and thermistors may also be used to complement or calibrate the thermal camera since it can be sensitive to multiple types of error.

In a particular embodiment, a plurality of image projectors may be used to simultaneously project different images onto different surface areas of the layer of material, thereby increasing the processed area. For example, multiple projectors can be arranged in a 1D array (straight line) and scanned in 1 direction over the entire bed. In addition, the image may be comprised of a plurality of partial images and the image projector may be controlled to project each of the partial images onto a different surface area of the layer of material, thereby forming a complete image. In other embodiments, a single projector can be scanned in 1 direction over the entire bed.

While the LAPS technology has been demonstrated as one possible implementation path, it is considered to be within the scope of the present invention to utilize other means of heating (i.e., other sources of incident light) the polymer material. For example, heating can be performed by selectively illuminating an array of lights (e.g., small LEDs or laser) to create an illuminated region which is then projected as incident light onto the surface of the material. In other embodiments, heating can be performed by scanning a point source (such as a laser) at high rate of speed repeatedly over a surface of the material so that it acts more like a lower intensity constant exposure. Other forms of energy source include a laser beam, a scanning mirror galvanometer or a lamp. Any combination of the energy sources disclosed herein can be used sequentially (in any order) or simultaneously in the methods disclosed. For example, a combination of laser and scanning mirror galvanometer can be used as an energy source.

In contrast with conventional sintering techniques known in the art, in the proposed material processing system, the incident light is projected over the course of a few seconds, instead of a few milliseconds, thereby allowing sufficient time for densifying, fusing, melting, and/or condensing the polymer material. For example, the incident light is projected greater than 100 ms, greater than 1 s, greater than 2 s, greater than 5 s, greater than 7 s, greater than 8 s, greater than 10 s, greater than 12 s, greater than 15 s, from 100 ms to 30 s, from 1 s to 15 s, or from 1 s to 10 s. The extended time also allows for monitoring (including in-situ monitoring) and control systems to be implemented. For example, the intensity of the incident light can be controlled based on the temperature of the polymer material in each spot. The incorporation of monitoring and control systems improves the quality of the resulting components by ensuring that every location within the material layer has been heated in accordance with the correct thermal profile.

In the projected incident light (e.g., the projected image), varying levels of power can be projected onto the material. In some embodiments, the incident light is projected at a power level from 1 $W/cm^2$ to 50 $W/cm^2$, from 1 $W/cm^2$ to 30 $W/cm^2$, from 1 $W/cm^2$ to 15 $W/cm^2$ or from 2 $W/cm^2$ to 15 $W/cm^2$. In specific examples, the methods include projecting an image over a 100 ms to 10 s time span at from 1 W/cm² to 50 W/cm² from an image projector (LAPS processing system) onto a surface area of the layer of material.

In some embodiments of the sintering process, incident light at a substantially constant power level is incident on a material and a lateral layer of the part is fabricated by simultaneously projecting the incident light on a subsection or over an entire surface area of the polymer material to densify, fuse, melt, and/or condense the polymer material optionally followed by cooling, until the entire layer has been sintered. When one layer is complete, the surface of the powder bed is lowered, another layer of powder is spread over the previous, now sintered layer, and the next layer is scanned. As a layer is completed, another layer of powder is deposited on top of the previous layer, either by a blade, a roller mechanism or some other uniform powder spreading technique and the process is repeated until a complete component (sintered article) is formed.

More specifically, layerwise sintering can be performed by dispensing a layer of polymer material over a platform to a desired thickness, and then directing energy from an energy source at the locations of the material layer that correspond to the cross-section of the object(s) to be formed in that layer. The polymer material at the irradiated locations is heated so as to fuse, for example by solid-phase sintering, and condense into a mass. The condensation reaction of the polymer material can be controlled after densifying the polymer material as described herein. Upon completion of fusing and condensing the layer, a subsequent layer of polymer material is placed over the prior layer, supported by both the fused and unfused polymer material, and the irradiation is repeated to define the cross-section of the object to be formed in the next layer. The process is repeated until the object is completely formed.

The methods disclosed herein can further comprise fusing individual subsections or an entire area of the multi-layered article and allowing each subsection or area to cool to form a 3D sintered article. In one embodiment of the present disclosure, the light from a source such as from a LAPS projection system may be used to fuse the multi-layer sintered article over individual subsections or over an entire area of the sintered article at one time.

Other advantages which are obvious and which are inherent to the invention will be evident to one skilled in the art. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

What is claimed is:

1. A method for increasing the molecular weight of a polymer material during an additive manufacturing process, the method comprising:
    a) disposing a first layer of the polymer material on a platform,
    b) exposing the first layer of the polymer material to an energy source, wherein the exposure is conducted for a period of time sufficient to cause condensation reaction and sintering of at least a portion of the polymer material, wherein the period of time is greater than fusing time during the sintering
    c) controlling the condensation reaction by allowing a desired increased number average molecular weight of the polymer material, wherein controlling the condensation reaction comprises adjusting an energy source-related parameter, a polymer-related parameter, a temperature related parameter, a vacuum related parameter, a process duration, a processing gas, an air flow volume and/or speed, or a combination thereof,
    d) repeating steps (a) to (c) to form an object in a layerwise fashion; and wherein the energy source is selected from an image from an image projector, an array of LEDs or lasers, or an effectively constant exposure obtained by repeatedly scanning a point source at high rate of speed over the layer of the polymer material.

2. The method of claim 1, further comprising maintaining the platform at an elevated temperature below an initial sintering temperature of the polymer material and/or preheating the surface of the layer of powder polymer prior to step (b).

3. The method of claim 1, wherein step (b) includes exposing the first layer of the polymer material to an electromagnetic beam or image.

4. The method of claim 1, wherein the energy source increases the temperature of the first layer of the polymer.

5. The method of claim 1, wherein controlling the condensation reaction comprises adjusting an energy source-related parameter selected from an intensity, pulse frequency, pulse duration, or a combination thereof.

6. The method of claim 1, wherein after condensation, the polymer material has a molecular weight that is at least 5% greater or at least 10% greater, than its molecular weight before condensation.

7. The method of claim 1, wherein step (d) is also done to fuse the polymer material in a second layer to a fused portion of the first layer.

8. The method of claim 1, wherein the polymer material is selected from a polyamide, a polystyrene, a polyester, a polyacetal, a polyalkylene, cellulose, a poly ether ether ketone, a poly ether ketone, a poly ether ketone ketone, a poly (meth)acrylate, a polyimide, a thermoplastic urethane, a polyether, a polyketone, a polycarbonate, a thermoplastic elastomer, a polyolefin, a copolyester, a thermoplastic vulcanite, a polyethene, a poly vinyl chloride, a blend thereof, a copolymer thereof, or a derivative thereof.

9. The method of claim 1, wherein the layer of polymer material has a thickness of from 10 microns to 1 mm.

10. The method of claim 1, wherein the energy source is projected for a duration of 1 sec to 30 sec.

11. A method for increasing the molecular weight of a polymer material during an additive manufacturing process, the method comprising:
    a) disposing a first layer of the polymer material on a platform,
    b) exposing the first layer of the polymer material to an energy source, wherein the exposure is conducted for a period of time sufficient to cause condensation reaction and sintering of at least a portion of the polymer material, wherein the period of time is greater than fusing time during the sintering,
    c) controlling the condensation reaction by allowing a desired increased number average molecular weight of the polymer material, and
    d) repeating steps (a) to (c) to form an object in a layerwise fashion.

12. The method of claim 11, further comprising maintaining the platform at an elevated temperature below an initial sintering temperature of the polymer material and/or preheating the surface of the layer of powder polymer prior to step (b).

13. The method of claim 11, wherein adjusting an energy source-related parameter is selected from an intensity, pulse frequency, pulse duration, or a combination thereof.

14. The method of claim 11, wherein after condensation, the polymer material has a molecular weight that is at least 5% greater or at least 10% greater, than its molecular weight before condensation.

15. A method for increasing the molecular weight of a polymer material during an additive manufacturing process, the method comprising:
   a) disposing a first layer of the polymer material on a platform,
   b) exposing the first layer of the polymer material to an energy source from an image, wherein the image is from an image projector, an array of LEDs or lasers, or an effectively constant exposure obtained by repeatedly scanning a point source at high rate of speed over the layer of polymer material, wherein the exposure is conducted for a period of time sufficient to cause condensation reaction and sintering of at least a portion of the polymer material, wherein the period of time is greater than fusing time during the sintering
   c) controlling a condensation reaction by allowing a desired increased number average molecular weight of the polymer material, and
   d) repeating steps (a) to (c) to form an object in a layerwise fashion.

* * * * *